United States Patent
Rihn et al.

(10) Patent No.: US 10,084,801 B2
(45) Date of Patent: Sep. 25, 2018

(54) TIME ZERO CLASSIFICATION OF MESSAGES

(71) Applicant: DELL SOFTWARE INC., Round Rock, TX (US)

(72) Inventors: Jennifer Rihn, Mountain View, CA (US); Jonathan J. Oliver, San Carlos, CA (US)

(73) Assignee: SonicWALL Inc., Milpitas, CA (US)

( * ) Notice: Subject to any disclaimer, the term of this patent is extended or adjusted under 35 U.S.C. 154(b) by 0 days.

(21) Appl. No.: 15/370,873

(22) Filed: Dec. 6, 2016

(65) Prior Publication Data

US 2017/0155670 A1 Jun. 1, 2017

Related U.S. Application Data

(63) Continuation of application No. 15/133,824, filed on Apr. 20, 2016, now Pat. No. 9,516,047, which is a continuation of application No. 14/472,026, filed on Aug. 28, 2014, now Pat. No. 9,325,724, which is a continuation of application No. 11/927,438, filed on Oct. 29, 2007, now Pat. No. 8,850,566, which is a
(Continued)

(51) Int. Cl.
*H04L 29/06* (2006.01)
*G06N 7/00* (2006.01)

(52) U.S. Cl.
CPC ......... *H04L 63/1416* (2013.01); *G06N 7/005* (2013.01); *H04L 63/0245* (2013.01); *H04L 63/145* (2013.01)

(58) Field of Classification Search
CPC .............. H04L 63/145; H04L 63/1416; H04L 63/1425; H04L 63/0245; G06F 21/56; G06N 7/005
See application file for complete search history.

(56) References Cited

U.S. PATENT DOCUMENTS

| 5,319,776 A | 6/1994 | Hile et al. |
| 5,452,442 A * | 9/1995 | Kephart ............... G06F 21/564 713/188 |

(Continued)

FOREIGN PATENT DOCUMENTS

| JP | 2005-011325 | 1/2005 |
| JP | 2005-259141 | 9/2005 |

(Continued)

OTHER PUBLICATIONS

"FileEXT Facts" Published 11/23/03 as verified by the Internet Archive (3 pages) http://web.archive.org/web/20031123132118/http://filext.com/faq/itx/0/017/article.
(Continued)

*Primary Examiner* — Joseph P Hirl
*Assistant Examiner* — Thomas Gyorfi
(74) *Attorney, Agent, or Firm* — Polsinelli LLP

(57) ABSTRACT

Detecting infectious messages comprises performing an individual characteristic analysis of a message to determine whether the message is suspicious, determining whether a similar message has been noted previously in the event that the message is determined to be suspicious, classifying the message according to its individual characteristics and its similarity to the noted message in the event that a similar message has been noted previously.

17 Claims, 5 Drawing Sheets

Related U.S. Application Data continuation of application No. 11/156,372, filed on Jun. 16, 2005, now Pat. No. 9,154,511.

(60) Provisional application No. 60/587,839, filed on Jul. 13, 2004.

(56) References Cited

U.S. PATENT DOCUMENTS

| | | | |
|---|---|---|---|
| 5,623,600 | A | 4/1997 | Ji et al. |
| 5,826,269 | A | 10/1998 | Hussey |
| 5,832,208 | A | 11/1998 | Chen et al. |
| 5,889,943 | A | 3/1999 | Ji et al. |
| 5,956,481 | A | 9/1999 | Walsh et al. |
| 6,035,423 | A | 3/2000 | Hodges et al. |
| 6,112,227 | A | 8/2000 | Heiner |
| 6,144,934 | A | 11/2000 | Stockwell et al. |
| 6,199,102 | B1 | 3/2001 | Cobb |
| 6,560,632 | B1 | 5/2003 | Chess et al. |
| 6,650,890 | B1 | 11/2003 | Irlam et al. |
| 6,701,440 | B1 | 3/2004 | Kim et al. |
| 6,732,279 | B2 | 5/2004 | Hoffman |
| 6,757,830 | B1 | 6/2004 | Tarbotton et al. |
| 6,763,462 | B1 | 7/2004 | Marsh |
| 6,763,467 | B1 | 7/2004 | Radatti et al. |
| 6,802,012 | B1 | 10/2004 | Smithson et al. |
| 6,813,712 | B1 | 11/2004 | Luke |
| 6,886,099 | B1 | 4/2005 | Smithson et al. |
| 6,892,241 | B2 | 5/2005 | Kouznetsov et al. |
| 6,898,715 | B1 | 5/2005 | Smithson et al. |
| 6,901,519 | B1 | 5/2005 | Stewart et al. |
| 6,941,348 | B2 | 9/2005 | Petry et al. |
| 6,941,466 | B2 | 9/2005 | Mastrianni |
| 6,944,555 | B2 | 9/2005 | Blackett et al. |
| 6,954,858 | B1 | 10/2005 | Welborn et al. |
| 6,971,023 | B1 | 11/2005 | Makinson et al. |
| 6,993,660 | B1 | 1/2006 | Libenzi et al. |
| 7,007,302 | B1 | 2/2006 | Jagger et al. |
| 7,010,696 | B1 | 3/2006 | Cambridge et al. |
| 7,010,807 | B1 | 3/2006 | Yanovsky |
| 7,017,187 | B1 | 3/2006 | Marshall et al. |
| 7,020,895 | B2 | 3/2006 | Albrecht |
| 7,043,757 | B2 | 5/2006 | Hoefelmeyer et al. |
| 7,062,553 | B2 | 6/2006 | Liang |
| 7,069,583 | B2 | 6/2006 | Yann et al. |
| 7,117,358 | B2 | 10/2006 | Bandini et al. |
| 7,124,438 | B2 | 10/2006 | Judge et al. |
| 7,143,356 | B1 | 11/2006 | Shafrir et al. |
| 7,159,149 | B2 | 1/2007 | Spiegel et al. |
| 7,213,260 | B2 | 5/2007 | Judge |
| 7,257,842 | B2 | 8/2007 | Barton et al. |
| 7,263,561 | B1 | 8/2007 | Green et al. |
| 7,299,361 | B1 | 11/2007 | Kim et al. |
| 7,310,816 | B1 | 12/2007 | Burns et al. |
| 7,343,624 | B1 | 3/2008 | Rihn |
| 7,360,246 | B2 | 4/2008 | Etoh et al. |
| 7,458,094 | B2 | 11/2008 | Jackson |
| 7,461,129 | B2 | 12/2008 | Shah et al. |
| 7,509,679 | B2 | 3/2009 | Alagna et al. |
| 7,526,809 | B2 | 4/2009 | Liang et al. |
| 7,647,321 | B2 | 1/2010 | Lund et al. |
| 7,673,002 | B1 | 3/2010 | Damarla |
| 7,748,038 | B2 | 6/2010 | Olivier et al. |
| 7,765,593 | B1 | 7/2010 | Lowe et al. |
| 7,774,229 | B1 | 8/2010 | Dernehl et al. |
| 8,122,508 | B2 | 2/2012 | Rihn |
| 8,429,232 | B1 | 4/2013 | Appenzeller et al. |
| 8,443,441 | B2 | 5/2013 | Stolfo et al. |
| 8,515,894 | B2 | 8/2013 | Yu |
| 8,850,566 | B2 | 9/2014 | Rihn |
| 8,955,106 | B2 | 2/2015 | Rihn |
| 8,955,136 | B2 | 2/2015 | Rihn |
| 9,154,511 | B1 | 10/2015 | Rihn |
| 9,237,163 | B2 | 1/2016 | Rihn |
| 9,325,724 | B2 | 4/2016 | Rihn |
| 9,516,047 | B2 | 12/2016 | Rihn |
| 2001/0005889 | A1 | 6/2001 | Albrecht |
| 2002/0004908 | A1 | 1/2002 | Galea |
| 2002/0091940 | A1 | 7/2002 | Welborn et al. |
| 2002/0116639 | A1 | 8/2002 | Chefalas et al. |
| 2002/0129277 | A1 | 9/2002 | Caccavale |
| 2002/0147780 | A1 | 10/2002 | Liu et al. |
| 2002/0178373 | A1 | 11/2002 | Altschul et al. |
| 2002/0194489 | A1 | 12/2002 | Almogy et al. |
| 2002/0194490 | A1 | 12/2002 | Halperin et al. |
| 2003/0074578 | A1 | 4/2003 | Ford et al. |
| 2003/0115485 | A1 | 6/2003 | Milliken |
| 2003/0120947 | A1 | 6/2003 | Moore et al. |
| 2003/0120950 | A1 | 6/2003 | Hunt |
| 2003/0154394 | A1 | 8/2003 | Levin |
| 2003/0158905 | A1 | 8/2003 | Petry et al. |
| 2003/0167402 | A1 | 9/2003 | Stolfo et al. |
| 2003/0172166 | A1 | 9/2003 | Judge et al. |
| 2003/0172302 | A1* | 9/2003 | Judge ................. H04L 63/145 726/22 |
| 2003/0191969 | A1 | 10/2003 | Katsikas |
| 2003/0204569 | A1 | 10/2003 | Andrews et al. |
| 2003/0233418 | A1 | 12/2003 | Goldman |
| 2004/0013295 | A1 | 1/2004 | Sabe et al. |
| 2004/0015718 | A1 | 1/2004 | DeClouet |
| 2004/0015726 | A1 | 1/2004 | Szor |
| 2004/0024639 | A1 | 2/2004 | Goldman |
| 2004/0030913 | A1 | 2/2004 | Liang et al. |
| 2004/0054917 | A1 | 3/2004 | Obrecht et al. |
| 2004/0059697 | A1 | 3/2004 | Forman |
| 2004/0073617 | A1 | 4/2004 | Milliken |
| 2004/0073810 | A1 | 4/2004 | Dettinger et al. |
| 2004/0083384 | A1 | 4/2004 | Hypponen |
| 2004/0117648 | A1 | 6/2004 | Kissel |
| 2004/0128355 | A1 | 7/2004 | Chao et al. |
| 2004/0128536 | A1 | 7/2004 | Elzam et al. |
| 2004/0158554 | A1 | 8/2004 | Trottman |
| 2004/0158741 | A1 | 8/2004 | Schneider |
| 2004/0186893 | A1 | 9/2004 | Ochiai |
| 2004/0199594 | A1 | 10/2004 | Radatti et al. |
| 2004/0210769 | A1 | 10/2004 | Radatti et al. |
| 2004/0230827 | A1 | 11/2004 | Franczek et al. |
| 2004/0255159 | A1 | 12/2004 | Williamson et al. |
| 2005/0015624 | A1 | 1/2005 | Ginter et al. |
| 2005/0055410 | A1 | 3/2005 | Landsman et al. |
| 2005/0060643 | A1 | 3/2005 | Glass et al. |
| 2005/0081051 | A1 | 4/2005 | Girouard et al. |
| 2005/0081059 | A1 | 4/2005 | Bandini et al. |
| 2005/0108338 | A1 | 5/2005 | Simske et al. |
| 2005/0108339 | A1 | 5/2005 | Gleeson et al. |
| 2005/0111367 | A1 | 5/2005 | Chao et al. |
| 2005/0125667 | A1 | 6/2005 | Sullivan et al. |
| 2005/0138432 | A1 | 6/2005 | Ransom et al. |
| 2005/0149749 | A1 | 7/2005 | Van Brabant |
| 2005/0210272 | A1 | 9/2005 | Fotta |
| 2005/0251862 | A1 | 11/2005 | Talvitie |
| 2005/0283837 | A1 | 12/2005 | Olivier et al. |
| 2006/0010209 | A1 | 1/2006 | Hodgson |
| 2006/0010213 | A1 | 1/2006 | Mehta |
| 2006/0010495 | A1 | 1/2006 | Cohen et al. |
| 2006/0053490 | A1 | 3/2006 | Herz et al. |
| 2006/0265745 | A1 | 11/2006 | Shackleton et al. |
| 2006/0288414 | A1 | 12/2006 | Kuroda |
| 2007/0294765 | A1 | 12/2007 | Rihn |
| 2008/0104703 | A1 | 5/2008 | Rihn |
| 2008/0134336 | A1 | 6/2008 | Rihn |
| 2012/0151590 | A1 | 6/2012 | Rihn |
| 2014/0373149 | A1 | 12/2014 | Rihn |
| 2015/0106936 | A1 | 4/2015 | Rihn |
| 2016/0127400 | A1 | 5/2016 | Rihn |
| 2016/0234233 | A1 | 8/2016 | Rihn |

FOREIGN PATENT DOCUMENTS

| | | |
|---|---|---|
| WO | WO 2005/076135 | 8/2005 |
| WO | WO 2005/116804 | 12/2005 |

(56) References Cited

FOREIGN PATENT DOCUMENTS

| WO | WO 2005/124600 | 12/2005 |
|---|---|---|
| WO | WO 2006/009620 | 1/2006 |

OTHER PUBLICATIONS

"Majordomo FAQ," Oct. 20, 2001.
"Spam Guard Network—eMail-Spam Filtering Desktop Software" Published May 27, 2002 as verified by the Internet Archive, http://web.archive.org/web/20020527012857/http://www.spamguard.net/.
"Using the Rules Wizard," Sams Teach Yourself Microsoft® Outlook™ 2000 in 10 Minutes, © 1999 Sams Publishing, excerpt from Chapter 8, (3 pages).
"Vispa Introduce Mail Guardian Spam & Virus Filtering," Published Apr. 14, 2004 from M2 Presswire, http://goliath.ecnext.com/coms2/gi_0199-226559/Vispa-introduce-Mail-Guardian-spam.html.
"WindowsSecurity.com Email Security Testing Zone," Published Feb. 7, 2003 and Mar. 4, 2003 as verified by the Internet Archive (11 pages) http://web.archive.org/web/20030207121425/http://www.windowsecurity.com/emailssecuritytest/ and http://web.arachive.org/web/20030304211950/www.windowsecurity.com/emailsecuritytest/faq.htm.
Abhay, Joshi "How to Protect your Company from 'Zero-Day' Exploits," Published Mar. 1, 2004 by Computerworld.com (2 pages), http://www.computerworld.com/s/article/print/90447/How_to_protect_your_company_from_zero_day_exploits?taxonomyName=Security&taxonomyId=17.
Angluin, Dana "Learning Regular Sets from Queries and Counter-examples," 1987.
Avinti, iSolation Server v.2, Whitepaper, 2005.
Basis Technology, Language Identifier, Automatically Identify the Language and Encoding of Incoming Text, 2004, http://www.basistech.com/language%2Didentification,Date of Download: Jul. 14, 2014.
Bastrup et al., Language Detection based on Unigram Analysis and Decision Trees, Date of Download: Sep. 24, 2014.
Betteridge,Ian "Windows JPEG Exploit Ventures into the Wild," Sep. 28, 2004, http://www.eweek.com/article2/0.1759.1659777.00.asp.
Brain, Marshall "How Web Servers Work: The Internet" Published Jun. 5, 2003 as verified by the Internet Archive (2 pages) http://web.archive.org/web/20030605034818/computer.howstuffworks.com/web-server2.htm.
Byrne, Julian, "My Spamblock," Google Groups Thread (Jan. 19, 1997).
Cheeseman et al., AAAI88, The Seventh National Conference on Artificial Intelligence, Bayesian Classification, Aug. 21-28, 1988, vol. 2.
Chua, Louis Zero-day Attacks, ComputerWorld, vol. 10, Issue No. 22, Jun. 9-22, 2004.
Collins et al., Efficient Induction of Finite State Automata, 1996.
Crocker, David H. "RFC 822: Standard for the Format of ARPA Internet Text Messages" originally published Aug. 13, 1982, http://www.faqs.org/ftp/rfc/pdf/rfc822.txt.pdf.
Dwork, Cynthia, et al. "Pricing via Processing or Combating Junk Mail," CRYPTO '92, Springer-Verlag LNCS 740, pp. 139-147, 1992.
Festa, Paul "ISP Software Puts Squeeze on Spam," Published Jun. 16, 2003 © 2003 Cnet News. (3 pages) http://news.cnet.com/ISP-software-puts-squeeze-on-spam/2100-1032_3-1017930.html.
Gaines, B.R. "Behavior/Structure Transformations Under Uncertainty," Mar. 1976.
Graham, Paul "A Plan for Spam," Published Aug. 2002 (8 pages), http://www.paulgraham.com/spam.html.
Graham, Paul "Better Bayesian Filtering," Published Jan. 2003 (13 pages), http://www.paulgraham.com/better.html.

Guilmette, Ronald F., "To Mung or Not to Mung," Google Groups Thread (Jul. 24, 1997).
Holtzman, Carey "Spam Attack? Bayesian Filters to the Rescue!" Published Aug. 9, 2004 (7 pages), http://www.crn.com/white-box/59200920;jsessionid=E32QCZFQCXRMVQE1GHPCKHWATMY32JVN.
Ironport, Press Release, Iron Port Systems.TM. Introduces "Virus Outbreak Filters" to Predict New Outbreaks, Protect Customer Networks, Jun. 14, 2004.
Kaspersky Lab, Review of 2004 Shows Malware Continuing at Unrelenting Pace, http://www.kaspersky.com/news?id=155897089.
Langberg, Mike, "Spam Foe Needs Filter of Himself," (Email Thread Dated Apr. 5, 2003).
Lee et al., RFC 1738, Uniform Resource Locators (URL), Dec. 1994.
Livingston, Brian "How Long Must You Wait for an Anti-Virus Fix?," http://itmanagement.earthweb.com/columns/executive.sub.—tech/article.php-/3316511, no date.
Mailfrontier, MailFrontier Anti-Virus: A Complete Solution to Protect Your Network from Outbreaks, no date.
McAfee, Security Headquarters, http://www.mcafeesecurity.com/us/security/home.asp.
McCullagh, Declan, "In-Boxes that Fight Back," News.com, May 19, 2003.
MessageLabs, MessageLabs Anti-Virus, How it works, htpp://www.messagelabs.com/services.antivirus/detail, no date.
Murhammer, Martin et al., "IP Network Design Guide" © 1999 IBM Redbooks. Excerpt from Chapter 6 (32 pages).
Oliver et al., Unsupervised Learning Using MML, no date.
Postel, Jonathan "RFC 821: Simple Mail Transfer Protocol," originally published Aug. 1982, http://www.faqs.org/ftp/rfc/pdf/rfc821.txt.pdf.
Postini, Postini White Paper, Email Intrusion Prevention: Stop Malicious Threats before They Harm Your Email System, no date.
Skoll, David F., "How to Make Sure a Human is Sending You Mail," Google Groups Thread (Nov. 17, 1996).
Snyder, Joel "Definition of Zero Day Protection," Aug. 9, 2004, http://seclists.org/lists/focus-ids/2004/Aug/0046.html.
Templeton, Brad, "Viking-12 Junk E-Mail Blocker," (believed to have last been updated Jul. 15, 2003).
Turner, Adam "Canning Spam," Published Apr. 6, 2004, © 2004 Syndey Morning Herald (5 pages) http://www.smh.com.au/articles/2004/04/05/1081017087281.html.
Various definitions for "instrinsic" from Dictionary.com © 1995-2009 by various, (2 pages) http://dictionary.reference.com/dic?q=intrinsic&search=search.
Vidal et al., PASCAL-Pattern Analysis, Statistical Modelling and Computational Learning, Probabilistic Finite State Automata—Part I, IEEE Transaction PAMI, no date.
Von Ahn, Luis, et al., "Telling Humans and COmputers Apart (Automatically) or How Lazy Cryptographers do AI," Communications to the ACM, Feb. 2004.
Webster's II New Riverside Dictionary definition for "instrinsic" © 1984, 1988 Houghton Mifflin Co. (4 pages).
What are n-grams good for? http://www.cs.ihu.edu/about.jason/465/PDFSlides/lect3-ngram-apps.pdf, Oct. 18, 2002.
Wikipedia article for "Echelon (signals intelligence)" as originally published on Mar. 27, 2004 (2 pages) http://en.wikipedia.org/w/index.php?title=Echelon2/028signals_intelligence%29&oldid=3030420&printable=yes.
U.S. Appl. No. 11/156,372 Final Office Action dated May 22, 2015.
U.S. Appl. No. 11/156,372 Office Action dated Jna. 15, 2015.
U.S. Appl. No. 11/156,372 Office Action dated Oct. 7, 2010.
U.S. Appl. No. 11/156,372 Final Office Action dated Mar. 30, 2010.
U.S. Appl. No. 11/156,372 Office Action dated Sep. 9, 2009.
U.S. Appl. No. 11/156,372 Final Office Action dated May 28, 2009.
U.S. Appl. No. 11/156,372 Office Action dated Dec. 10, 2008.
U.S. Appl. No. 11/156,372 Final Office Action dated Jul. 22, 2008.
U.S. Appl. No. 11/156,372 Office Action dated Nov. 26, 2007.
U.S. Appl. No. 11/927,438 Final Office Action dated Feb. 21, 2013.
U.S. Appl. No. 11/927,438 Office Action dated Jul. 13, 2012.
U.S. Appl. No. 11/927,438 Final Office Action dated Nov. 25, 2011.
U.S. Appl. No. 11/927,438 Office Action dated Jun. 9, 2011.

(56) References Cited

OTHER PUBLICATIONS

U.S. Appl. No. 11/927,438 Final Office Action dated Jul. 12, 2010.
U.S. Appl. No. 11/927,438 Final Office Action dated Apr. 13, 2010.
U.S. Appl. No. 11/927,438 Office Action dated Sep. 29, 2009.
U.S. Appl. No. 14/472,026 Office Action dated Oct. 2, 2015.
U.S. Appl. No. 14/472,026 Office Action dated Mar. 12, 2015.
U.S. Appl. No. 11/156,373 Office Action dated Sep. 5, 2007.
U.S. Appl. No. 11/927,424 Office Action dated Jun. 24, 2011.
U.S. Appl. No. 11/927,424 Final Office Action dated Nov. 16, 2010.
U.S. Appl. No. 11/927,424 Office Action dated May 25, 2010.
U.S. Appl. No. 13/400,548 Final Office Action dated Nov. 5, 2013.
U.S. Appl. No. 13/400,548 Office Action dated May 6, 2013.
U.S. Appl. No. 11/895,519 Final Office Action dated Mar. 3, 2014.
U.S. Appl. No. 11/895,519 Office Action dated Oct. 11, 2013.
U.S. Appl. No. 11/895,519 Final Office Action dated Nov. 16, 2009.
U.S. Appl. No. 11/895,519 Office Action dated Mar. 31, 2009.
U.S. Appl. No. 14/993,059 Office Action dated Sep. 22, 2017.
U.S. Appl. No. 14/993,059 Final Office Action dated Feb. 9, 2018.

* cited by examiner

TIME ZERO CLASSIFICATION OF MESSAGES

CROSS-REFERENCE TO RELATED APPLICATIONS

The present application is a continuation and claims the priority benefit of U.S. application Ser. No. 15/133,824 filed Apr. 20, 2016, now U.S. Pat. No. 9,516,047, which is a continuation and claims the priority benefit of U.S. application Ser. No. 14/472,026 filed Aug. 28, 2014, now issued U.S. Pat. No. 9,325,724, which is a continuation and claims the priority benefit of U.S. application Ser. No. 11/927,438 filed Oct. 29, 2007, now issued U.S. Pat. No. 8,850,566, which is a continuation and claims the priority benefit of U.S. application Ser. No. 11/156,372 filed Jun. 16, 2005, now issued U.S. Pat. No. 9,154,511, which claims the priority benefit of U.S. provisional application 60/587,839 filed Jul. 13, 2004, the disclosures of which are incorporated herein by reference.

BACKGROUND OF THE INVENTION

Computer viruses and worms are often transmitted via electronic messages. An infectious message usually comes in the form of an e-mail with a file attachment, although other forms of infection are possible. Attackers have exploited many protocols that exchange electronic information, including email, instant messaging, SQL protocols, Hyper Text Transfer Protocols (HTTP), Lightweight Directory Access Protocol (LDAP), File Transfer Protocol (FTP), telnet, etc. When the attachment is opened, the virus executes. Sometimes the virus is launched through a link provided in the email. Virus or worm attacks can cause considerable damage to organizations. Thus, many anti-virus solutions have been developed to identify viruses and prevent further damage. Currently, most anti-virus products use virus signatures based on known viruses for identification. Such systems, however, often do not protect the network effectively during the time window between a virus' first appearance and the deployment of its signature. Networks are particularly vulnerable during this time window, which is referred to as "time zero" or "day zero". For a typical anti-virus system to function effectively, it usually requires viruses to be identified, their signatures developed and deployed. Even after the system adapts after an outbreak, time zero threat can sometimes re-immerge as the virus mutates, rendering the old signature obsolete.

One approach to time zero virus detection is to use a content filter to identify and quarantine any message with a potentially executable attachment. This approach is cumbersome because it could incorrectly flag attachments in Word, Excel and other frequently used document formats even if the attachments are harmless, resulting in high rate of misidentification (also referred to as false positives). Furthermore, the approach may not be affective if the virus author disguises the nature of the attachment. For example, some virus messages ask the recipients to rename a .txt file as .exe and then click on it. Sometimes the virus author exploits files that were not previously thought to be executable, such as JPEG files. Therefore, it would be useful to have a better time zero detection technique. It would also be desirable if the technique could detect viruses more accurately and generate fewer false positives.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting infectious messages is disclosed. Analysis of individual characteristics of messages is performed in some embodiments to determine whether the message is suspicious. If a message is deemed suspicious, it is determined whether a similar message has been noted previously as possibly suspicious. If a similar message has been previously noted, the message is classified according to its individual characteristics and its similarity to the noted message. In some embodiments, if a message that was forwarded is later found to be infectious, the infectious message is reported to human or machine agents for appropriate action to take place.

Figure 1:
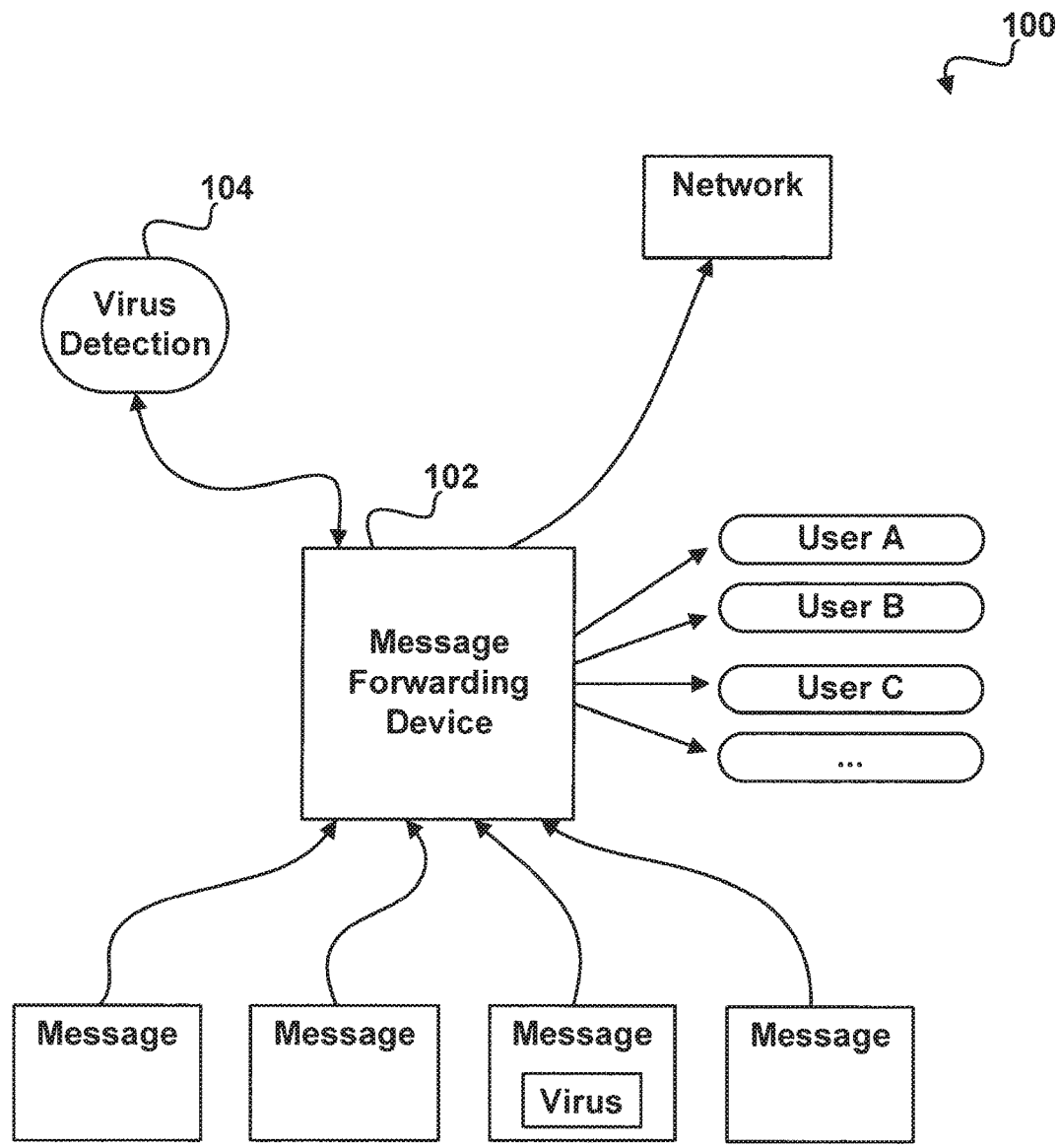
FIG. 1 is a system diagram illustrating an embodiment of a message delivery system.

FIG. 1 is a system diagram illustrating an embodiment of a message delivery system. In this example, message forwarding device 102 may be implemented as a mail server or gateway or other appropriate device. The message forwarding device is configured to forward messages received on its input interface. As used herein, forwarding includes sending a message to email servers or gateways, networking devices, email clients of individual recipients, or any other appropriate locations in the message's path of flow. Some of the messages to be forwarded may be infectious (i.e. containing viruses, worms or other items that may cause unwanted behavior on the recipient's device and/or the network). In this example, an infectious message detection mechanism 104 cooperates with the message forwarding device to identify the virus and prevents infectious messages from further spreading. In some embodiments, the virus detection mechanism is implemented as software, firmware, specialized hardware or any other appropriate techniques on the message forwarding device. In some embodiments, the detection mechanism is implemented on a separate device.

Figure 2:
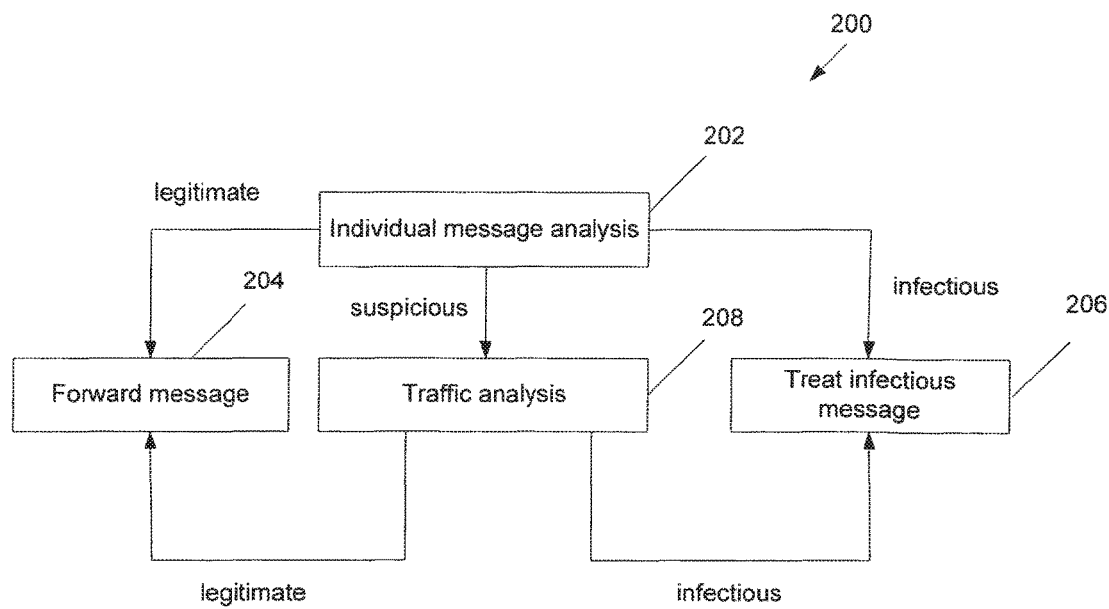
FIG. 2 is a flowchart illustrating a process embodiment for detecting infectious messages.

FIG. 2 is a flowchart illustrating a process embodiment for detecting infectious messages. Process 200 may be implemented on a message forwarding device, a standalone device, or as a part of another network monitoring/security device for any other appropriate device systems. In this example, an individual message analysis is performed initially (202). As will be shown in more details below, the individual message analysis evaluates the intrinsic characteristics of the message, determines the probability of the message being infectious, and classifies the message. In some embodiments, the message is classified as legitimate, suspicious or infectious based on the probability. The message is determined to be legitimate if the probability is below a legitimate threshold, infectious if the probability exceeds an infectious threshold, and suspicious if the probability is somewhere between the two thresholds. Other evaluations and classification techniques are used in different embodiments.

In the process shown, if a message is determined to be legitimate, the message is forwarded to the appropriate recipient (204). If the message is determined to be infectious, the message is treated as appropriate (206). In some embodiments, the message is quarantined or deleted from the delivery queue. If a message is deemed to be suspicious, a traffic analysis is performed on the suspicious message (208). The traffic analysis identifies any traffic spike in the e-mail message stream that is consistent with the pattern of a virus outbreak. Details of the traffic analysis are described below. In this example, analysis of a message in the context of all message traffic yields another probability of the message being infectious, and classifies the suspicious message as either legitimate or infectious according to the probability. Legitimate messages are processed normally and forwarded to their destinations (204). Infectious messages are treated appropriately (206). Other classifications are also possible. The order of the analyses may be different in some implementations and some embodiments perform the analysis in parallel. In some embodiments, each analysis is performed independently.

Figure 3:
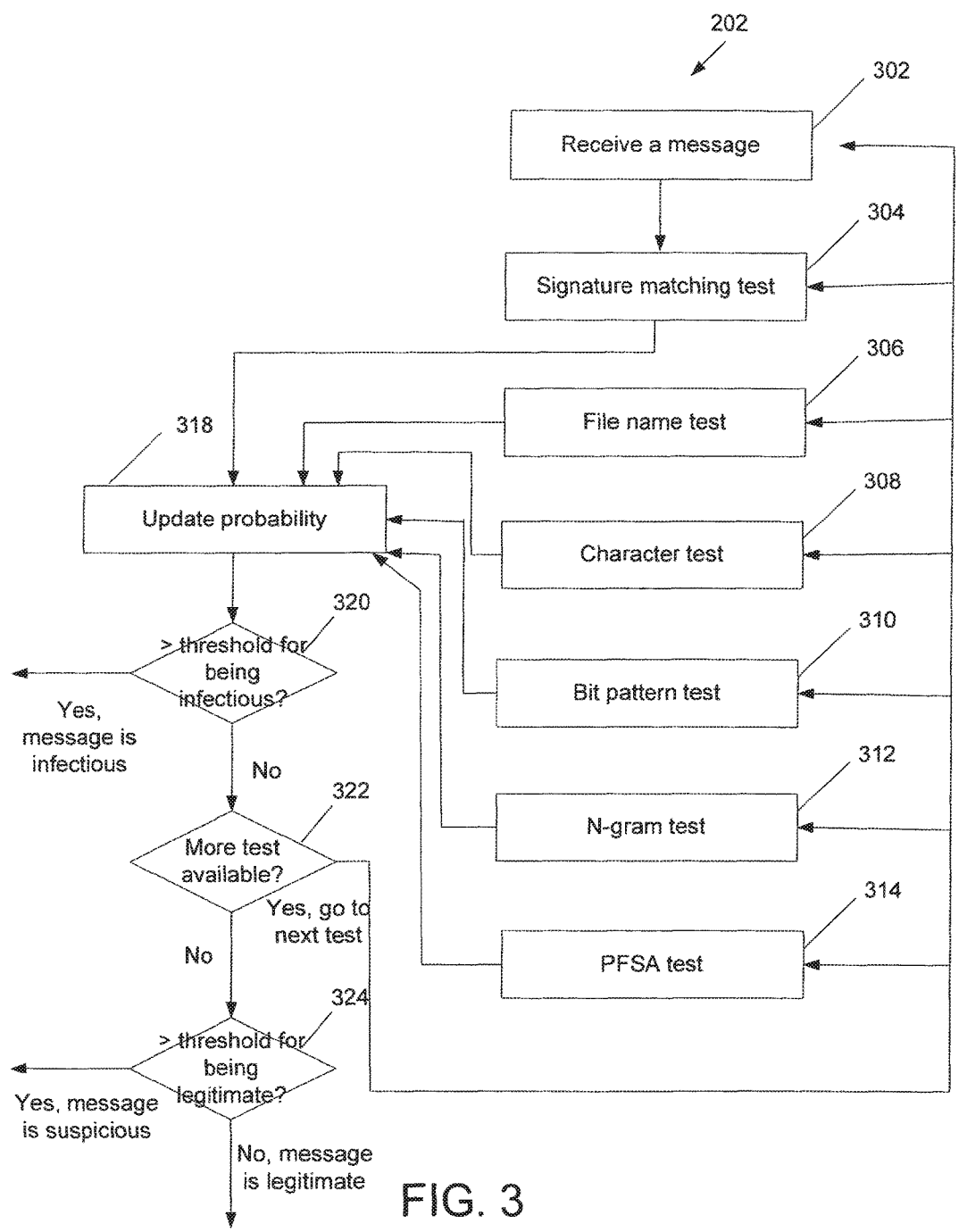
FIG. 3 is a flowchart illustrating the implementation of the individual message analysis according to some embodiments.

FIG. 3 is a flowchart illustrating the implementation of the individual message analysis according to some embodiments. In this example, process 202 initiates when a message is received (302). The message is then submitted to a plurality of tests configured to examine the characteristics of the message and detect any anomalies. After each test, the probability of the message being infectious is updated according to the test result (318). In some embodiments, the weight of different test results in calculating the probability may vary.

It is then determined whether the probability exceeds the threshold for the message to be deemed infectious (320). If so, the message is considered infectious and may be quarantined, deleted from send queue, or otherwise appropriately handled. If, however, the probability does not exceed the threshold, it is determined whether more tests are available (322). If so, the next available test is applied and the process of updating probability and testing for threshold is repeated. If no more tests are available, the probability is compared to the threshold required for a legitimate message (324). If the probability exceeds the legitimate threshold, the message is deemed to be suspicious. Otherwise, the tests indicate that the message is legitimate. The classification of the message is passed on to the next routine. According to process 200, depending on whether the message is legitimate, suspicious or infectious, the next routine may forward the message, perform traffic analysis on the message, or treat the message as infectious.

Examples of the tests used in the individual message analysis include signature matching tests (304), file name tests (306), character tests (308), bit pattern tests (310), N-gram tests (312), bit pattern test (314), and probabilistic finite state automata (PFSA) tests (316). The tests may be arranged in any appropriate order. Some tests maybe omitted and different tests may be used.

Some of the tests analyze the intrinsic characteristics of the message and/or its attachments. In the embodiments shown, the signature matching test (304) compares the signature of the message with the signatures of known viruses. The test in some embodiments generates a probability on a sliding scale, where an exact match leads to a probability of 1, and an inexact match receives a probability value that depends on the degree of similarity.

The file name test (306) examines the name of the attachment and determines if there is anomaly. For example, a file name such as "read me.txt.exe" is highly suspicious since it would appear that the sender is attempting to misrepresent the nature of the executable and pass the file off as a text file.

The character test (308) processes the content of the attachment and determines the possibility that the file maybe an infectious one. Characters that are unusual for the message file type indicate that the attachment has a higher likelihood of being infectious. For example, documents that purport to be text documents and contain many characters more common to an executable could be suspicious. In some embodiments, the character test examines certain portions of the message that is supposed to contain characters and omit the rest to avoid false positives. For example, if a document contains text and pictures, the character test will only process the text portion.

The bit pattern test (310) examines certain portions of the file and determines whether there is anomaly. Many files contain embedded bit patterns that indicate the file type. The magic number or magic sequence is such a bit pattern. For example, an executable file includes a particular bit pattern that indicates to the operating system that the file is an executable. The operating system will execute any file that starts with the magic sequence, regardless of the file extension. If an attachment has an extension such as .txt or .doc that seems to indicate that the file is textual in nature, yet the starting sequence in the file contains the magic sequence of an executable, then there is a high probability that the sender is attempting to disguise an executable as a text document. Therefore, the attachment is highly suspicious.

Some of the tests such as N-gram (312) and PFSA (314) measure the deviation of the received message from a baseline. In this example, the baseline is built from a collection of known good messages. An N-gram model describes the properties of the good messages. The N-gram model is a collection of token sequences and the corresponding probability of each sequence. The tokens can be characters, words or other appropriate entities. The test compares the N-gram model to an incoming message to estimate the probability that a message is legitimate. The probabilities of the N-gram sequences of the incoming messages can be combined with the probabilities of the N-gram sequences of the baseline model using any of several methods. In some embodiments, the N-gram test compares the test result with a certain threshold to determine the legitimacy of a message. In some embodiments, a message deemed legitimate by the N-gram test is not subject to further testing, thus reducing false positive rate. In some embodiments, a message found to be legitimate by the N-gram test is further tested to ascertain its true legitimacy.

In the example shown, the PFSA test (314) relies on a model that is built from a set of known good messages. The model describes the properties of legitimate messages. The model includes a plurality of token such as characters and words, and the probabilities associated with the tokens. The test estimates the probability that a particular message that includes a sequence of tokens can be generated by the model. In some embodiments, similar to the N-gram test, the test result is compared with a certain threshold to determine the legitimacy of a message. In some embodiments, a message deemed legitimate by the PFSA test is not subject to further testing to avoid false positives. In some embodiments, a message found to be legitimate by the PFSA test is further tested to ascertain its true legitimacy.

In some embodiments, information about previously received messages is collected and used to identify an increase in the number of similar and potentially suspicious messages. Messages are clustered to establish a statistical model that can be used to detect similar messages. The data collected may include one or more of the following: time of receipt, the recipients, number of recipients, the sender, size of the attachment, number of attachments, number of executable attachments, file name, file extension, file type according to the starting sequence of the file binary, etc. The characteristics of an incoming message are compared to the model to determine whether similar messages have been noted previously. A traffic spike in similar messages that were previously noted as potentially suspicious indicates the likelihood of a virus outbreak.

In some embodiments, traffic patterns are analyzed on a global network level. In other words, the analysis may monitor all the messages routed through an internet service provider and note the suspicious ones. In some embodiments, the traffic patterns are analyzed locally. For example, messages on a local network or on different subnets of a local network may be analyzed separately. In some embodiments, a combination of global and local analyses is used.

In local traffic analysis, different subnets can have different traffic patterns. For example, within a corporation, the traffic on the engineering department subnet may involve a large number of executables and binary files. Thus, absent other indicators, executables and binary attachments will not always trigger an alarm. In contrast, the traffic pattern of the accounting department may mostly involve text documents and spreadsheets, therefore an increase in binary or executable attachments would indicate a potential outbreak. Tailoring traffic analysis based on local traffic can identify targeted attacks as well as variants of old viruses.

Figure 4:
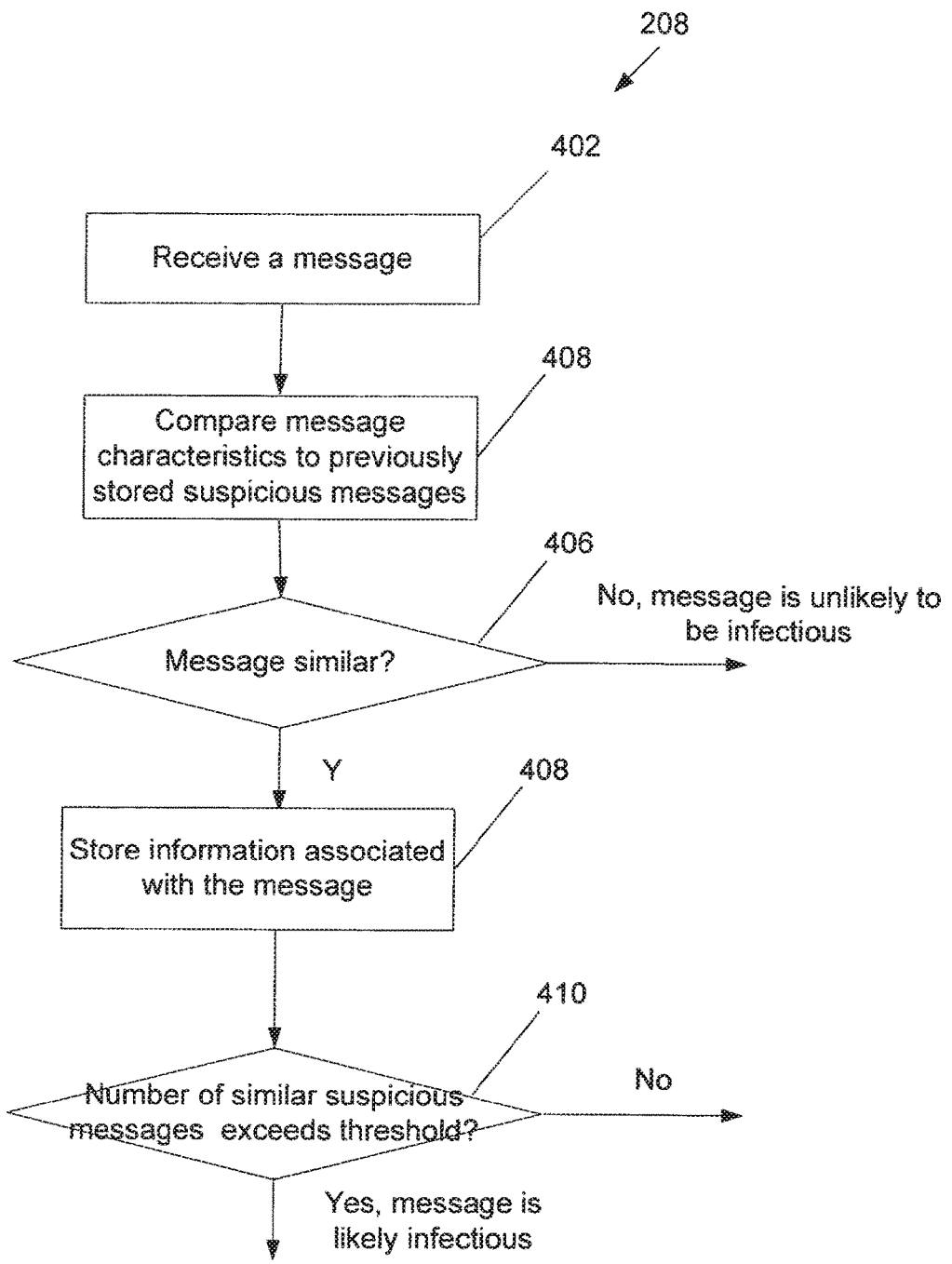
FIG. 4 is a flowchart illustrating an embodiment of traffic analysis.

FIG. 4 is a flowchart illustrating an embodiment of traffic analysis. Process 208 may be performed after the individual message analysis as shown in process 200, before the individual message analysis, in combination with other analysis, or independently. Process 208 initiates when a message is received (402). The characteristics of the message are compared to the characteristics of previously stored suspicious messages (404). In some embodiments, the system collects suspicious messages resulting from other tests such as the ones in the individual message analysis shown in FIG. 3.

It is then determined whether the message is similar to the previous stored messages (406). If the message is not similar to any of the previously stored suspicious messages, a low probability of infectiousness is assigned. If, however, the message is similar to previous stored suspicious messages, information associated with the received message is also stored and the statistical model is updated accordingly (408). It is then determined whether the number of such similar and suspicious messages has exceeded a predefined threshold (410). If not, the message is not classified as infectious at this point, although a higher probability may be assigned to it. If the total number of such suspicious messages has exceeded the threshold, it is likely that the message is indeed infectious and should be appropriately treated. For example, consider the case where the threshold number is set to 5, and there are already 4 instances of suspicious messages with executable attachments having the same extension and similar size. When a fifth message arrives with similar sized executable attachments with the same extension, the message will be classified as infectious. By selecting an appropriate threshold value, infectious messages can be detected and prevented without a major outbreak.

Figure 5:
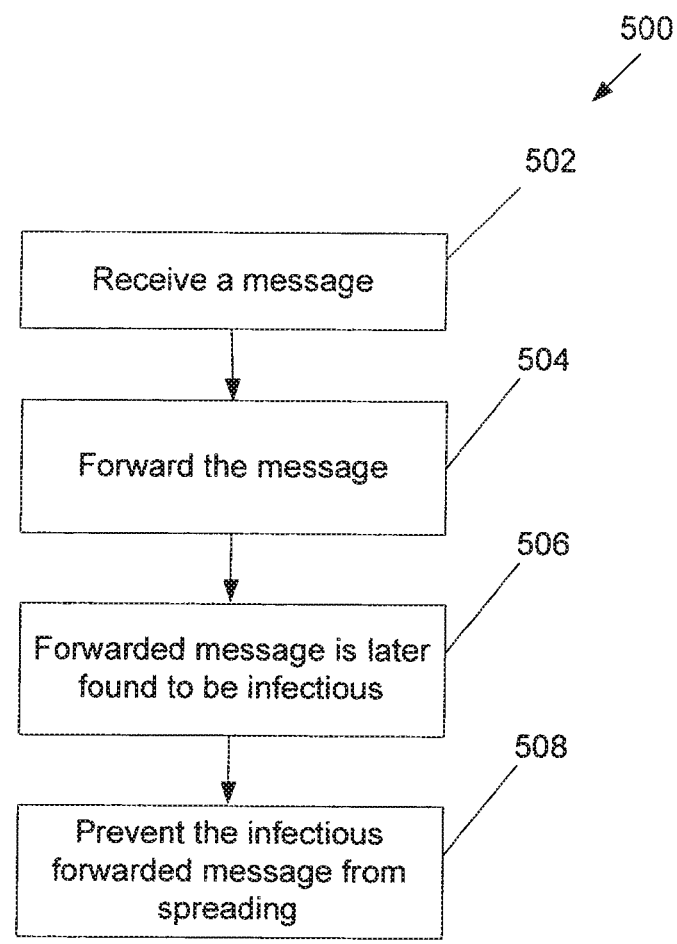
FIG. 5 is a flowchart illustrating another embodiment of traffic analysis.

Sometimes the system may initially find a message to be legitimate or merely suspicious and forward the message to its destination. Later as more information becomes available, the system may find the message to be infectious. FIG. 5 is a flowchart illustrating another embodiment of traffic analysis. Process 500 may be performed independently or in conjunction with other types of message analyses. In the example shown, a message is received (502). The message is initially determined to be legitimate and forwarded (504). Sometime after the message has been forwarded, the forwarded message is determined to be infectious (506). A message may be found as infectious according to any appropriate message analysis techniques, including those described in this specification. In some embodiments, information pertaining to the forwarded message is optionally stored in memory, on disk or in other forms of storage medium so that it can be used for the analysis. Again, consider the example where the threshold number in the traffic analysis is set to 5 and 4 similar messages have been received. Although these 4 messages are noted as suspicious, because the threshold is not met the messages are still forwarded. The characteristics of the suspicious messages are stored. When a similar fifth message is received, its characteristics are compared to the characteristics of the four previously noted messages. N-gram, PFSA or other appropriate techniques can be used in the comparison. The analysis shows that the number of similar and suspicious messages meets the threshold. Therefore, the fifth message is infectious, as are the four previously noted and forwarded messages.

Once an already forwarded message is deemed infectious, measures are taken to prevent the infectious forwarded message from spreading (508). In the example shown above, the system will take actions to keep the 4 instances of previously forwarded messages from being opened or resent by their recipients. Additionally, the system will not forward the fifth message. In some embodiments, the system reports the finding to the system administrator, the recipient, and/or other users on the network to prevent the previously forwarded infectious messages from further spreading. Warning messages, log messages or other appropriate techniques may be used. In some embodiments, the system generates a cancellation request to a forwarding agent such as the mail server, which will attempt to prevent the messages from being forwarded by deleting them from the send queue, moving the messages into a location to be quarantined or any other appropriate action.

Detecting and managing infectious messages have been disclosed. By performing individual message analysis and/or traffic analysis, infectious messages can be more accurately identified at time zero, and infectious messages that initially escaped detection can be later identified and prevented from further spreading.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for classifying a message, the method comprising:
receiving a message at a computer network interface;
performing a first test on content associated with the received message;
assigning an infectiousness probability to the received message based on the first test;
comparing the assigned infectiousness probability to a plurality of thresholds;
classifying the received message as suspicious based on the assigned infectiousness probability being above a legitimate threshold and below an infectious threshold;
performing a second test on the content associated with the received message;
updating the infectiousness probability of the received message based on the second test;
comparing the updated infectiousness probability to the thresholds;
re-classifying the message as infectious based on the updated infectiousness probability meeting the infectious threshold; and
performing an action based on the reclassification of the message, wherein the action includes preventing the message from being delivered to a recipient of the message when the reclassification indicates infectiousness.

2. The method of claim 1, wherein the second test performed on the content associated with the received message includes at least one of a signature matching test, a file mane test a character test, a bit pattern test, an N-gram test, and a probabilistic finite stat automata test.

3. The method of claim 1, wherein updating the infectiousness probability comprises assigning a value of one when the second test identifies that at least a portion of the content associated with the received message exactly matches a signature associated with a known virus.

4. The method of claim 1, wherein updating the infectiousness probability comprises assigning a value that corresponds to a degree of similarity in accordance with a statistical model that includes one or more characteristics that are associated with a virus.

5. The method of claim 4, wherein the one or more characteristics include one or more of a signature, a receipt time, the identity of a recipient, a number of recipients, a sender, an attachment size, a number of attachments, a number of executable attachments, a file name, a file type, and conflicting information in an attachment name.

6. The method of claim 4, further comprising:
receiving a plurality of additional messages that include at least one of the characteristics;
increasing a count for each of the additional messages that include the at least one characteristic;
identifying that the count has crossed a virus count threshold; and
preventing at least one of the additional messages from being delivered to a recipient based on the identification that the count has crossed the virus count threshold.

7. A non-transitory computer readable storage medium having embodied thereon a program executable by a processor to perform a method for classifying a message, the method comprising:
receiving a message over a computer network interface;
performing a first test on content associated with the received message;
assigning an infectiousness probability to the received message based on the first test;
comparing the assigned infectiousness probability to a plurality of thresholds;
classifying the received message as suspicious based on the assigned infectiousness probability being above a legitimate threshold and below an infectious threshold;
performing a second test on the content associated with the received message;
updating the infectiousness probability of the received message based on the second test;
comparing the updated infectiousness probability to the thresholds;
re-classifying the message as infectious based on the updated infectiousness probability meeting the infectious threshold; and
performing an action based on the reclassification of the message, wherein the action includes preventing the message from being delivered to a recipient of the message when the reclassification indicates infectiousness.

8. The non-transitory computer readable storage medium of claim 7, wherein the second test performed on the content associated with the received message includes at least one of a signature matching test, a file mane test a character test, a bit pattern test, an N-gram test, and a probabilistic finite stat automata test.

9. The non-transitory computer readable storage medium of claim 7, wherein updating the infectiousness probability comprises assigning a value of one when the second test identifies that at least a portion of the content associated with the received message exactly matches a signature associated with a known virus.

10. The non-transitory computer readable storage medium of claim 7, wherein updating the infectiousness probability comprises assigning a value that corresponds to a degree of similarity in accordance with a statistical model that includes one or more characteristics that are associated with a virus.

11. The non-transitory computer readable storage medium of claim 10, wherein the one or more characteristics include one or more of a signature, a receipt time, the identity of a recipient, a number of recipients, a sender, an attachment size, a number of attachments, a number of executable attachments, a file name, a file type, and conflicting information in an attachment name.

12. The non-transitory computer readable storage medium of claim 10, wherein the program further comprises instructions executable to:

receive a plurality of additional messages that include at least one of the characteristics;

increase a count for each of the additional messages that include the at least one characteristic;

identify that the count has crossed a virus count threshold; and prevent at least one of the additional messages from being delivered to a recipient based on the identification that the count has crossed the virus count threshold.

13. An apparatus for classifying a message, the apparatus comprising:

a network interface that receives a message over a computer network interface; and a processor that executes instructions out of memory to:

perform a first test on content associated with the received message;

assign an infectiousness probability to the received message based on the first test, compare the assigned infectiousness probability to a plurality of thresholds, classify the received message based on the assigned infectiousness probability being above a legitimate threshold and below an infectious threshold, perform a second test on the content associated with the received message, update the infectiousness probability of the received message based on the second test, compare the updated infectiousness probability to the thresholds, re-classify the message as infectious based on the updated infectiousness probability meeting the infectious threshold, and perform an action based on the reclassification of the message, wherein the action includes preventing the message from being delivered to a recipient of the message when the reclassification indicates infectiousness.

14. The apparatus of claim 13, wherein the second test performed on the content associated with the received message includes at least one of a signature matching test, a file mane test a character test, a bit pattern test, an N-gram test, and a probabilistic finite stat automata test.

15. The apparatus of claim 13, wherein the processor updates the infectiousness probability by assigning a value of one when the second test identifies that at least a portion of the content associated with the received message exactly matches a signature associated with a known virus.

16. The apparatus of claim 13, wherein the processor updates the infectiousness probability by assigning a value that corresponds to a degree of similarity in accordance with a statistical model that includes one or more characteristics that are associated with a virus.

17. The apparatus of claim 13, wherein the processor executes further instructions to:

receive a plurality of additional messages that include at least one of the characteristics;

increase a count for each of the additional messages that include the at least one characteristic;

identify that the count has crossed a virus count threshold; and prevent at least one of the additional messages from being delivered to a recipient based on the identification that the count has crossed the virus count threshold.

* * * * *